(12) United States Patent
Pertsel et al.

(10) Patent No.: US 8,189,057 B2
(45) Date of Patent: *May 29, 2012

(54) CAMERA EXPOSURE OPTIMIZATION TECHNIQUES THAT TAKE CAMERA AND SCENE MOTION INTO ACCOUNT

(75) Inventors: Shimon Pertsel, Sunnyvale, CA (US); Eli Pozniansky, Santa Clara, CA (US); Ohad Meitav, Cupertino, CA (US)

(73) Assignee: CSR Technology Inc., San Jose, CA (US)

( * ) Notice: Subject to any disclaimer, the term of this patent is extended or adjusted under 35 U.S.C. 154(b) by 419 days.

This patent is subject to a terminal disclaimer.

(21) Appl. No.: 12/479,703

(22) Filed: Jun. 5, 2009

(65) Prior Publication Data

US 2009/0256921 A1   Oct. 15, 2009

Related U.S. Application Data

(63) Continuation of application No. 11/258,975, filed on Oct. 25, 2005, now Pat. No. 7,546,026.

(51) Int. Cl.
*H04N 5/228* (2006.01)
*H04N 5/235* (2006.01)
(52) U.S. Cl. .......... 348/208.16; 348/362; 348/154
(58) Field of Classification Search .......... 348/208.16, 348/362, 154–155
See application file for complete search history.

(56) References Cited

U.S. PATENT DOCUMENTS

| | | |
|---|---|---|
| 3,626,827 A | 12/1971 | Yanagi et al. |
| 3,690,234 A | 9/1972 | Costianes |
| 3,828,122 A | 8/1974 | McPhee et al. |
| 4,218,119 A * | 8/1980 | Schickedanz ............ 396/100 |
| 5,043,816 A | 8/1991 | Nakano et al. |
| 5,220,375 A | 6/1993 | Ishida et al. |
| 5,223,935 A | 6/1993 | Tsuji et al. |
| 5,255,044 A | 10/1993 | Ishiguro et al. |
| 5,490,225 A | 2/1996 | Kumagai et al. |
| 5,692,223 A | 11/1997 | Ichikawa et al. |
| 5,742,340 A | 4/1998 | Alves |
| 5,905,848 A | 5/1999 | Yano et al. |
| 5,999,746 A | 12/1999 | Kitagawa et al. |

(Continued)

FOREIGN PATENT DOCUMENTS

JP   H04-038778   2/1992

(Continued)

OTHER PUBLICATIONS

Pertsel et al., "Camera Exposure Optimization Techniques That Take Camera and Scene Motion Into Account," U.S. Appl. No. 11/258,975, filed Oct. 25, 2005, 30 pages.

(Continued)

*Primary Examiner* — Hung Lam
(74) *Attorney, Agent, or Firm* — Frommer Lawrence & Haug LLP; John W. Branch (57) ABSTRACT

Quantities of motion regarding an imaging device such as an electronic camera are calculated and used to adjust the exposure time and one or more other exposure parameters used to capture an image to improve the quality of the image. Motion blur caused by movement of the camera or by movement of an object within the scene being photographed is reduced by selecting appropriate exposure parameters. Further, when there is little or no motion detected, the exposure parameters may be selected to improve the depth of field and reduce the noise in the captured image.

33 Claims, 5 Drawing Sheets

U.S. PATENT DOCUMENTS

| | | | |
|---|---|---|---|
| 6,072,525 | A | 6/2000 | Kaneda et al. |
| 6,173,121 | B1 | 1/2001 | Tomita et al. |
| 6,301,440 | B1 | 10/2001 | Bolle et al. |
| 6,532,264 | B1 | 3/2003 | Kahn |
| 6,859,618 | B1 | 2/2005 | Yip et al. |
| 6,891,570 | B2 * | 5/2005 | Tantalo et al. ............. 348/362 |
| 6,900,846 | B2 | 5/2005 | Lee et al. |
| 6,903,764 | B2 | 6/2005 | Kusaka et al. |
| 6,914,624 | B1 | 7/2005 | Esquibel et al. |
| 6,961,518 | B2 | 11/2005 | Suzuki |
| 7,030,911 | B1 * | 4/2006 | Kubo ..................... 348/221.1 |
| 7,692,715 | B2 * | 4/2010 | Kitajima .................. 348/362 |
| 7,697,836 | B2 | 4/2010 | Pozniansky et al. |
| 8,013,909 | B2 * | 9/2011 | Nikkanen et al. ......... 348/229.1 |
| 2002/0039137 | A1 | 4/2002 | Harper et al. |
| 2003/0063322 | A1 | 4/2003 | Itoh et al. |
| 2003/0095189 | A1 | 5/2003 | Liu et al. |
| 2003/0174772 | A1 | 9/2003 | Voronov et al. |
| 2003/0180037 | A1 | 9/2003 | Sommers |
| 2004/0130628 | A1 | 7/2004 | Stavely |
| 2004/0160525 | A1 | 8/2004 | Kingetsu et al. |
| 2004/0169768 | A1 | 9/2004 | Lee et al. |
| 2004/0218079 | A1 * | 11/2004 | Stavely et al. .......... 348/333.11 |
| 2004/0239771 | A1 | 12/2004 | Habe |
| 2004/0252765 | A1 | 12/2004 | Hosoda |
| 2005/0128343 | A1 | 6/2005 | Murata et al. |
| 2006/0008171 | A1 | 1/2006 | Petschnigg et al. |
| 2006/0017814 | A1 | 1/2006 | Pinto et al. |
| 2006/0017837 | A1 | 1/2006 | Sorek et al. |
| 2006/0029377 | A1 * | 2/2006 | Stavely et al. ................ 396/54 |
| 2006/0029382 | A1 | 2/2006 | Uchida |
| 2006/0039690 | A1 | 2/2006 | Steinberg et al. |
| 2006/0056835 | A1 * | 3/2006 | Poon et al. ................ 396/310 |
| 2006/0115297 | A1 | 6/2006 | Nakamaru |
| 2006/0170816 | A1 | 8/2006 | Silverstein et al. |
| 2006/0187308 | A1 | 8/2006 | Lim et al. |
| 2007/0009245 | A1 | 1/2007 | Ito |
| 2007/0071424 | A1 * | 3/2007 | Poon et al. .................. 396/52 |
| 2007/0092244 | A1 | 4/2007 | Pertsel et al. |
| 2008/0043112 | A1 * | 2/2008 | Nikkanen et al. ......... 348/217.1 |
| 2008/0044170 | A1 | 2/2008 | Yap et al. |
| 2009/0040364 | A1 * | 2/2009 | Rubner ..................... 348/362 |
| 2009/0154821 | A1 | 6/2009 | Sorek et al. |
| 2009/0231449 | A1 | 9/2009 | Tzur et al. |
| 2010/0150540 | A1 | 6/2010 | Pozniansky et al. |
| 2010/0201826 | A1 * | 8/2010 | Steinberg et al. .......... 348/208.4 |

FOREIGN PATENT DOCUMENTS

| | | |
|---|---|---|
| JP | 5-34757 | 2/1993 |
| JP | H06-176514 | 6/1994 |
| JP | 6-308588 | 11/1994 |
| JP | H07-307889 | 11/1995 |
| JP | H08-256289 | 10/1996 |
| JP | 08-320511 | 12/1996 |
| JP | 8-327917 | 12/1996 |
| JP | 10174027 | 6/1998 |
| JP | H10-336511 | 12/1998 |
| JP | 11-088810 | 3/1999 |
| JP | H11-326346 | 12/1999 |
| JP | 2002-359756 | 12/2002 |
| JP | 2004-215283 | 7/2004 |
| JP | 2005109824 | 4/2005 |

OTHER PUBLICATIONS

"Xenon flash lamp," from Wikipedia, http://en.wikipedia.org/wiki/Xenon_flash_lamp, downloaded on Jul. 5, 2006, 3 pages.

International Search Report and Written Opinion for International Patent Application No. PCT/US2007/082128, mailed May 15, 2008.

International Preliminary Report on Patentability for International Patent Application No. PCT/US2007/082128, mailed May 7, 2009.

Official Communication for European Patent Application No. 06850051.1, mailed Feb. 24, 2009.

Official Communication for Chinese Patent Application No. 200680049194.8, mailed Mar. 19, 2010.

Official Communication for Chinese Patent Application No. 200680049194.8, mailed Sep. 7, 2010.

International Search Report and Written Opinion for International Patent Application No. PCT/US2006/060056, mailed Sep. 6, 2007.

International Preliminary Report on Patentability for International Patent Application No. PCT/US2006/060056, mailed May 8, 2008.

Official Communication for U.S. Appl. No. 12/709,667, mailed Sep. 16, 2010.

Official Communication for U.S. Appl. No. 11/552,717, mailed Jun. 25, 2009.

Official Communication for U.S. Appl. No. 11/552,717, mailed Feb. 9, 2010.

Official Communication for U.S. Appl. No. 11/258,975, mailed Jun. 4, 2008.

Official Communication for U.S. Appl. No. 11/258,975, mailed Nov. 28, 2008.

Official Communication for U.S. Appl. No. 11/258,975, mailed Feb. 9, 2009.

Official Communication for U.S. Appl. No. 11/258,975, mailed Apr. 10, 2009.

Official Communication for Japanese Patent Application No. 2008-538133 mailed Aug. 29, 2011.

Official Communication for Japanese Patent Application No. H10-544219 dated Mar. 19, 2008.

Official Communication for U.S. Appl. No. 12/397,727 mailed Jun. 21, 2011.

Official Communication for U.S. Appl. No. 12/709,667 mailed Apr. 15, 2011.

Official Communication for U.S. Appl. No. 12/709,667 mailed Aug. 3, 2011.

Official Communication for U.S. Appl. No. 12/709,667 mailed Nov. 9, 2011.

* cited by examiner

CAMERA EXPOSURE OPTIMIZATION TECHNIQUES THAT TAKE CAMERA AND SCENE MOTION INTO ACCOUNT

CROSS-REFERENCE TO RELATED APPLICATION

This utility patent application is a Continuation of allowed U.S. patent application Ser. No. 11/258,975 filed on Oct. 25, 2005, now U.S. Pat. No. 7,546,026 the benefits of which are claimed under 35 U.S.C. §120, and is further incorporated herein by reference.

BACKGROUND

This application relates to automatic exposure control of digital cameras and other electronic video acquisition devices, and, more specifically, to the calculation and utilization therein of optimal exposure parameters to capture data of still or a sequential series of images. All patents, patent applications, articles, other publications and things referenced herein are hereby incorporated herein by this reference in their entirety for all purposes.

Electronic cameras image scenes onto a two-dimensional sensor such as a charge-coupled-device (CCD), a complementary metal-on-silicon (CMOS) device or other type of light sensor. These devices include a large number of photodetectors (typically two, three, four or more million) arranged across a small two dimensional surface that individually generate a signal proportional to the intensity of light or other optical radiation (including infrared and ultra-violet regions of the spectrum adjacent the visible light wavelengths) striking the element. These elements, forming pixels of an image, are typically scanned in a raster pattern to generate a serial stream of data representative of the intensity of radiation striking one sensor element after another as they are scanned. Color data are most commonly obtained by using photodetectors that are sensitive to each of distinct color components (such as red, green and blue), alternately distributed across the sensor.

A popular form of such an electronic camera is a small hand-held digital camera that records data of a large number of picture frames either as still photograph "snapshots" or as sequences of frames forming a moving picture. A significant amount of image processing is typically performed on the data of each frame within the camera before storing on a removable non-volatile memory such as a magnetic tape cartridge or a flash memory card. The processed data are typically displayed as a reduced resolution image on a liquid crystal display (LCD) device on the outside of the camera. The processed data are also typically compressed before storage in the non-volatile memory in order to reduce the amount of storage capacity that is taken by the data for each picture frame.

The data acquired by the image sensor are typically processed to compensate for imperfections of the camera and to generally improve the quality of the image obtainable from the data. The correction for any defective pixel photodetector elements of the sensor is one processing function. Another is white balance correction wherein the relative magnitudes of different pixels of the primary colors are set to represent white. This processing also includes de-mosaicing the individual pixel data to superimpose data from spatially separate monochromatic pixel detectors of the sensor to render superimposed multi-colored pixels in the image data. This de-mosaicing then makes it desirable to process the data to enhance and smooth edges of the image. Compensation of the image data for noise and variations of the camera optical system across the image and for variations among the sensor photodetectors is also typically performed within the camera. Other processing typically includes one or more of gamma correction, contrast stretching, chrominance filtering and the like.

Electronic cameras also nearly always include an automatic exposure control capability that sets the exposure time, size of its aperture opening and analog electronic gain of the sensor to result in the luminescence of the image or succession of images being at a certain level based upon calibrations for the sensor being used and user preferences. These exposure parameters are calculated in advance of the picture being taken, and then used to control the camera during acquisition of the image data. For a scene with a particular level of illumination, a decrease in the exposure time is made up by increasing the size of the aperture or the gain of the sensor, or both, in order to obtain the data within a certain luminescence range. An increased aperture results in an image with a reduced depth of field and increased optical blur, and increasing the gain causes the noise within the image to increase. Conversely, when the exposure time can be increased, such as when the scene is brightly lighted, the aperture and/or gain are reduced, which results in the image having a greater depth of field and/or reduced noise. In addition to analog gain being adjusted, or in place of it, the digital gain of an image is often adjusted after the data have been captured.

It is often difficult for the user to hold a camera by hand during an exposure without imparting some degree of shake or jitter, particularly when the camera is very small and light. As a result, the captured image may have a degree of overall motion blur that depends on the exposure time, the longer the time the more motion blur in the image. In addition, long exposures of a scene that is totally or partially moving can also result in motion blur in the captured image. An object moving fast across the scene, for example, may appear blurred in the image. The automatic exposure processing of existing cameras does not take into account motion of the camera or motion within the scene when calculating the exposure parameters to be used to capture an image of the scene.

SUMMARY

According to the present invention, motion is detected and the exposure parameters are set, in advance of capturing data of the image, to levels that enhance the captured image based on the amount of motion of the scene relative to the image frame within the camera. Blur of the image caused by either camera shake or local motion within the scene, or both, can be minimized or even prevented by adjusting the exposure parameters. Conversely, in cases where little or no motion is detected prior to capturing the image data, the exposure parameters may be set to optimize other aspects of the image, such as increasing the exposure time in order to allow the depth of field to be increased and/or the level of noise to be reduced.

Motion is preferably measured by calculating motion quantities from data of two or more images prior to capturing data of the final image (pre-capture images). Motion quantities that define the amount of motion of the scene image relative to the camera, including motion within the scene, are preferably calculated. Such relative motion quantities may include direction, thereby being motion vectors, or may just express the magnitude of the motion. By this technique, local motion vectors are individually calculated for distinct blocks of pixels within the image, which then allows motion within the scene to be taken into account when calculating the exposure parameters. Global motion vectors, such as caused by camera shake, can also be calculated from data of the two or more pre-capture images. Although the presence of motion blur can be detected from data of a single image, the calculation of motion vectors from two or more pre-capture images is more precise and leads to better control of the exposure parameters used to subsequently capture the image. Use of a mechanical motion sensor, which is included in some cameras, can only provide an indication of any global motion, not individual motion of objects or portions within the scene being photographed.

The results of the image motion calculations may also be used to estimate future motion so that a time to capture data of the image may be chosen where the absolute velocity of motion is at least less than at other times and possibly minimal. Particularly in the case of camera shake, where the motion often has some periodicity to it that can be forecasted, the picture can be taken at a time when the global motion is zero or near zero. The velocity of a portion of the scene can also be forecasted in the same way and a time chosen to take the picture when the local motion blur is minimized. When doing this forecasting, the exposure parameters are preferably calculated from the motion quantities that are expected to exist at the time scheduled for capturing the image.

In a preferred implementation, preliminary exposure parameters are calculated in the same manner as in existing cameras, without regard to any motion of the camera or portions of the scene image. If these preliminary parameters are at levels where their adjustment is not likely to improve the quality of the image, then the image is captured with them and the results of motion calculations are not used. An example where this can occur is with a brightly lighted scene, where the preliminary exposure time is nearly as short, the aperture nearly as small and the gain nearly as low as the camera allows. In such a case, the exposure time can neither be significantly shortened to limit any motion blur nor increased to significantly improve depth of field or reduce noise since the aperture and gain level are nearly as small as possible. But when this is not the case, the preliminary exposure parameters are adjusted on the basis of the image motion calculations to improve the quality of the captured image.

Additional aspects, advantages and features of the present invention are included in the following description of exemplary examples thereof, which description should be taken in conjunction with the accompanying drawings.

DESCRIPTION OF EXEMPLARY EMBODIMENTS

Video data acquired by a digital camera are typically processed to compensate for imperfections of the camera and to generally improve the quality of the image obtainable from the data. The correction for any defective pixel photodetector elements of the sensor is one processing function that may be performed. Another is white balance correction wherein the relative magnitudes of different pixels of the primary colors are set to represent white. This processing may also include de-mosaicing the individual pixel data to superimpose data from spatially separate monochromatic pixel detectors of the sensor to render superimposed multicolored pixels in the image data. This de-mosaicing then makes it desirable to process the data to enhance and smooth edges of the image. Compensation of the image data for noise and variations of the camera optical system across the image and for variations among the sensor photodetectors may also be performed. Other processing typically includes one or more of gamma correction, contrast stretching, chrominance filtering and the like. The processed data are then usually compressed by use of a commercially available algorithm before storage in a non-volatile medium.

Rather than post-processing the acquired video data by taking image motion into account, however, the present invention monitors images of the scene in advance of taking the picture and then sets the exposure parameters to values that enhance the resulting image based on the amount of motion present. The processing calculates at least an optimal exposure time that can be used along with other exposure parameters to acquire data of an image. The amount of camera jitter is preferably determined by comparing data of two or more pre-capture images, typically having lower resolution than the final acquired image, rather than using a gyroscope or other mechanical camera motion detector, although such a motion detector may alternatively be used. The pre-capture images may also be used to determine an amount of motion of objects within the scene being photographed and the exposure time and level can be calculated to enhance the image based on the amount of such motion.

Electronic Camera Example

Figure 1:
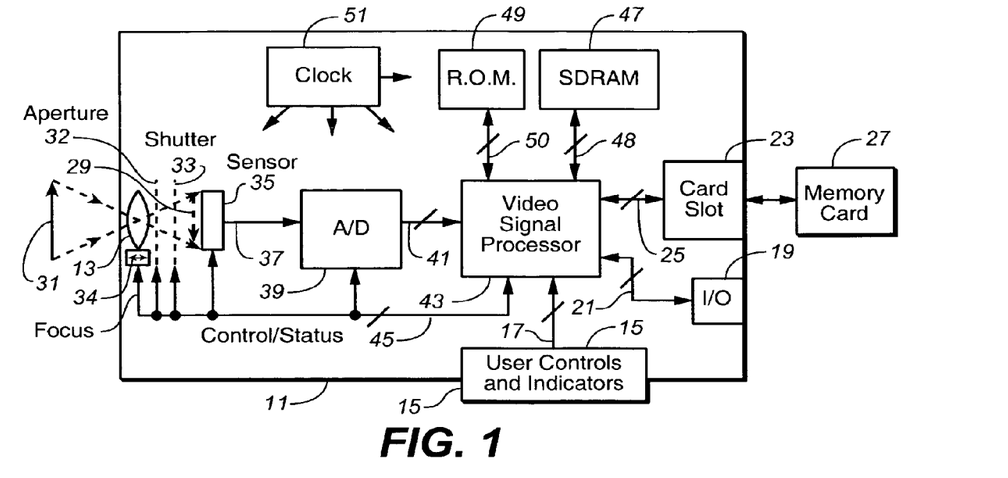
FIG. 1 illustrates a camera or other video acquisition device in which the exposure control techniques of the present invention may be implemented.

In FIG. 1, an example of a camera in which the present invention may be implemented is schematically shown, which may be a still camera or a video camera. It includes a case 11, an imaging optical system 13, user controls and indicators 15 that generate and receive control signals 17, a video input-output receptacle 19 with internal electrical connections 21, and a card slot 23, with internal electrical connections 25. A non-volatile memory card 27 is removably inserted into the card slot 23. Data of images captured by the camera may be stored on the memory card 27 or in an-internal non-volatile memory (not shown). Image data may also be outputted to another video device through the receptacle 19. The memory card 27 can be a commercially available semiconductor flash memory, small removable rotating magnetic disk or other non-volatile memory to which video data can be written by the camera.

The optical system 13 can be a single lens, as shown, but will normally be a set of lenses. An image 29 of a scene 31 is formed in visible optical radiation through an aperture 32 and a shutter 33 onto a two-dimensional surface of an image sensor 35. A motive element 34 moves one or more elements of the optical system 13 to focus the image 29 on the sensor 35. An electrical output 37 of the sensor carries an analog signal resulting from scanning individual photo-detectors of the surface of the sensor 35 onto which the image 29 is projected. The sensor 35 typically contains a large number of individual photo-detectors arranged in a two-dimensional array of rows and columns to detect individual pixels of the image 29. Signals proportional to the intensity of light striking the individual photo-detectors are obtained in the output 37 in time sequence, typically by scanning them in a raster pattern, where the rows of photo-detectors are scanned one at a time from left to right, beginning at the top row, to generate a frame of video data from which the image 29 may be reconstructed. The analog signal 37 is applied to an analog-to-digital converter circuit chip 39 that generates digital data in circuits 41 of the image 29. Typically, the signal in circuits 41 is a sequence of individual blocks of digital data representing the intensity of light striking the individual photo-detectors of the sensor 35.

The photo-detectors of the sensor 35 typically detect the intensity of the image pixel striking them in one of two or more individual color components. Early sensors detect only two separate colors of the image. Detection of three primary colors, such as red, green and blue (RGB) components, is common. Currently, image sensors that detect more than three color components are becoming available.

Processing of the video data in circuits 41 and control of the camera operation are provided, in this embodiment, by a single integrated circuit chip 43 (which may also include the analog-to-digital converter instead of using the separate circuit chip 39). These functions may be implemented by several integrated circuit chips connected together but a single chip is preferred. In addition to being connected with the circuits 17, 21, 25 and 41, the circuit chip 43 is connected, to control and status lines 45. The lines 45 are, in turn, connected with the aperture 32, shutter 33, focus actuator 34, sensor 29, analog-to-digital converter 39 and other components of the camera to provide synchronous operation of them. Signals in the lines 45 from the processor 43 drive the focus actuator 34 and set the size of the opening of the aperture 32, as well as operate the shutter 33. The gain of the analog signal path is also set by the processor 43 through the lines 45. This gain typically takes place in the analog-to-digital converter which, in the case of a CCD sensor, is part of the sensor, or in the case of a CMOS sensor, is part of a separate analog-to-digital converter as shown in FIG. 1.

A separate volatile random-access memory circuit chip 47 is also connected to the processor chip 43 through lines 48 for temporary data storage. Also, a separate non-volatile memory chip 49 is connected to the processor chip 43 through lines 50 for storage of the processor program, calibration data and the like. The memory 49 may be flash memory, which is re-programmable, or a memory that is programmable only once, such as a masked programmable read-only-memory (PROM) or an electrically programmable read-only-memory (EPROM). A usual clock circuit 51 is provided within the camera for providing clock signals to the circuit chips and other components. Rather than a separate component, the clock circuit for the system may alternatively be included on the processor chip 43.

Figure 2:
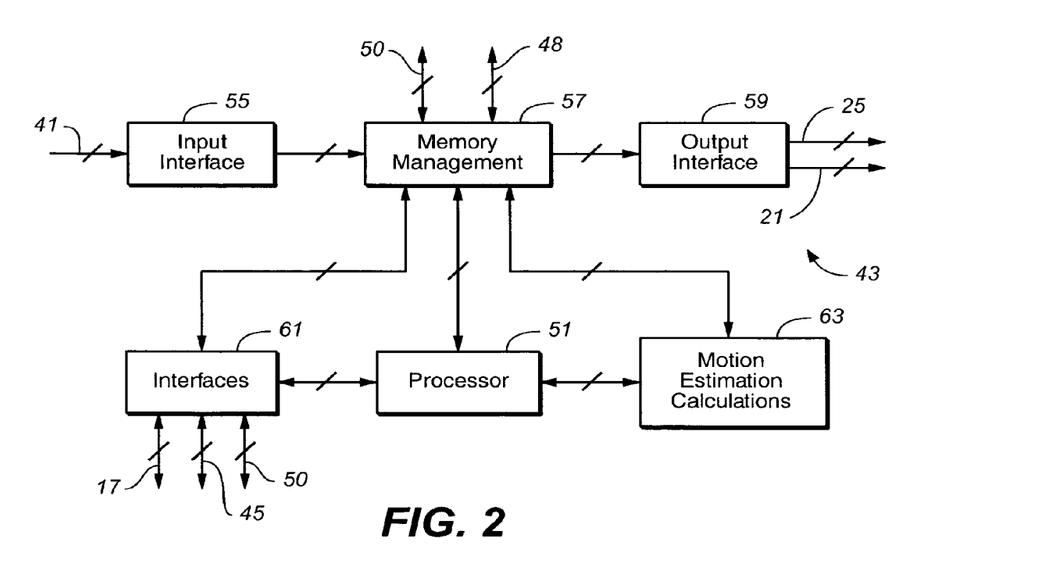
FIG. 2 is a block diagram of some of the functional components of the video signal processor of the device of FIG. 1.

A general block diagram of the processor chip 43, including portions that calculate and estimate motion, is given in FIG. 2. A processor 51, which may be general purpose or dedicated to the tasks herein, performs calculations on the image data and controls operation of the camera, in response to firmware stored in the flash memory 49 (FIG. 1). Digital data of successive image frames are received over lines 41 by an interface circuit 55 through input contacts on the chip 43, and then communicated with other system components by connection through a memory management unit 57. Video data of captured image frames are outputted through an interface circuit 59 to lines 21 (to the input-output receptacle 19 of FIG. 1) and 25 (to the flash memory card slot 23 of FIG. 1) that are connected to output contacts on the chip 43. Interface circuits 61 communicate between the lines 17, 45 and 50 (see FIG. 1) and the processor 51 and memory management unit 57.

Circuits 63 of FIG. 2, also connected with the processor 51 and memory management unit 57, are optionally included to perform at least some of the calculations necessary to estimate motion of the image from data of successive image frames. This is usually more efficient than employing the processor 51 to make the calculations under control of the firmware but the calculations could alternatively be made by the processor.

Setting Exposure Parameters

Figure 3:
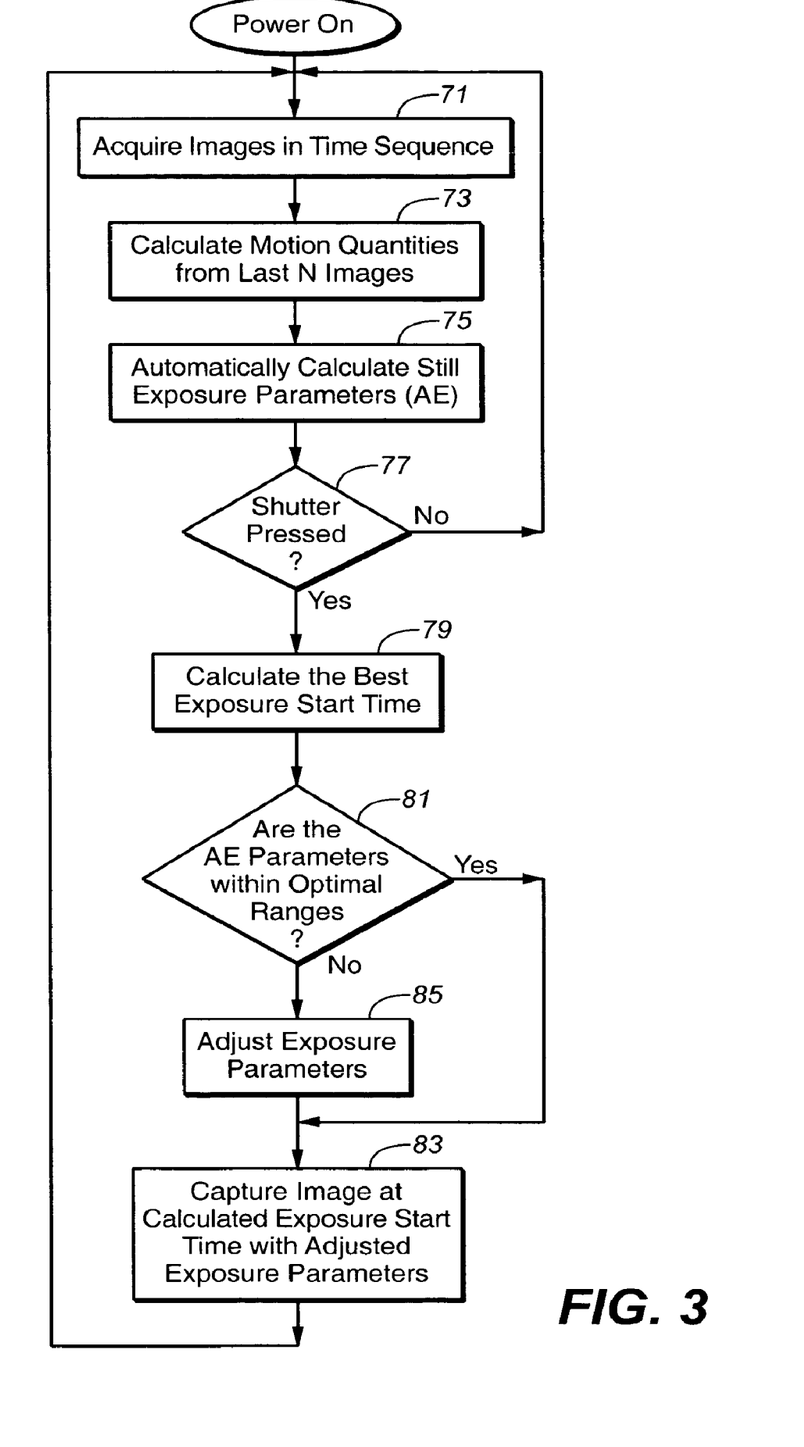
FIG. 3 is a flow chart showing steps of calculating and using exposure parameters according to one specific embodiment of the present invention.

FIG. 3 is a flowchart that illustrates an example of a process implemented within a camera such as illustrated in FIGS. 1 and 2 to calculate exposure parameters for use in acquiring data of an image. Once the camera is turned on by the user, it repetitively acquires data of images, as indicated by a step 71, at many frames per second, which can be as high as 30 or more. In the usual camera, these pre-capture images are displayed in sequence on the camera's LCD display with a reduced resolution, as a preview of an image that the camera would capture when its shutter button is pushed but they need not be displayed. Two other calculation functions 73 and 75 are performed each time data of a new pre-capture image are acquired. This processing is continuous while the camera is being used. When it is detected that the camera user has depressed the shutter button to take a picture, as indicated by a step 77, the quantities and parameters calculated in steps 73 and 75 are ready for use in setting up the camera up to quickly take the picture. Alternatively, however, the calculations 73 and 75 could be made after the step 77 has detected depression of the shutter button.

In the step 73, data of N number of pre-capture images are used to calculate motion quantities for use in setting the exposure parameters, where N equals two or more, and can be five or more. As explained in detail below, any change in motion of the scene image relative to the camera's photosensor is detected and quantified by looking at changes in successive pre-capture images, both globally (movement of the entire image) and locally (local movement within the image). Vectors of motion, velocity and acceleration are preferably calculated from data of N pre-capture images, thereby allowing a prediction to be made of the future location of the scene image, or a portion of it, on the photosensor.

In the step 75, exposure parameters are calculated by existing techniques, without regard to any image motion, in order to maintain the average luminescence across the image within a predefined range. The average luminescence can be measured from a pre-capture image. The time duration of the exposure and one or more other exposure parameters are calculated in this step. The other exposure parameters typically include the size of the aperture opening and gain. However, although these parameters are used directly to set current cameras to take a picture, they are treated in the camera operation shown in FIG. 3 as preliminary, subject to modification by the results of the motion calculations 73.

Once depression of the shutter button is detected by the step 77, the picture could be taken as soon thereafter as possible. However, it is preferred to first look at the motion quantities calculated in the step 73. Taking of the picture may then be postponed for a time until any motion of the image is expected to be minimal, in order to minimize any motion blur in the resulting image. Therefore, in a step 79, the, optimum instant to take the picture is estimated from the motion quantities calculated in step 73. This estimate is made by extrapolating the motion quantities calculated from the pre-capture images in the step 73, and then identifying either zero or minimal motion within a set period. It is at that instant that the picture is scheduled to be taken. If, however, a zero or minimal motion point cannot be detected with high precision, due to the complexity of the motion, or if the user has chosen to turn off the delayed capturing option, or if the motion quantities show that there is little or no motion of the image, then the time for taking the picture is not postponed and capture of the image is executed right away.

A next step 81 determines whether the exposure parameters automatically calculated in the step 75 are such that the motion quantities will not cause them to be altered. For example, if the exposure duration (shutter speed) is set by the step 75 to be below a certain threshold, then no further decrease of the exposure time to reduce motion blur should be done. And if the aperture and gain are also set by the step 75 to be smaller than corresponding thresholds, then it is not necessary to consider whether motion in the image is small enough to allow the shutter speed to be increased in order to lower them to improve depth of field or reduce noise. In such a case, which occurs for example, in a very brightly illuminated scene, the processing proceeds to a step 83 where the picture is taken with the exposure parameters set by the step 75. The motion quantities calculated in the step 73 are not used or even referenced. Nor is the calculation of step 79 of the time to take the picture necessary; the picture can be taken right away.

However, in most situations the scene is not so brightly illuminated. Therefore, when the preliminary parameters calculated by the step 75 are not within optimum ranges, they are adjusted by a step 85 in order to optimize them for the amount of motion that was calculated by the step 73. Generally, if that motion is high, the exposure time is reduced, with a corresponding increase in the size of the aperture and/or increase in the gain in order to maintain the same average image signal luminescence. This reduces motion blur, but the depth of field generally will decrease and/or the noise of the image may increase. But this tradeoff will almost always be preferred to acquiring an image with motion blur.

On the other hand, if the calculated motion is low or zero, the exposure time may be increased, with the benefit that the size of the aperture and/or the gain may be decreased. This provides an image with a greater depth of field, less optical blur and less noise. Without having the calculated motion quantities, it would be risky to adjust the preliminary parameters calculated by the step 75 in this way since it could result in increased motion blur in the image when motion is present.

Figure 4:
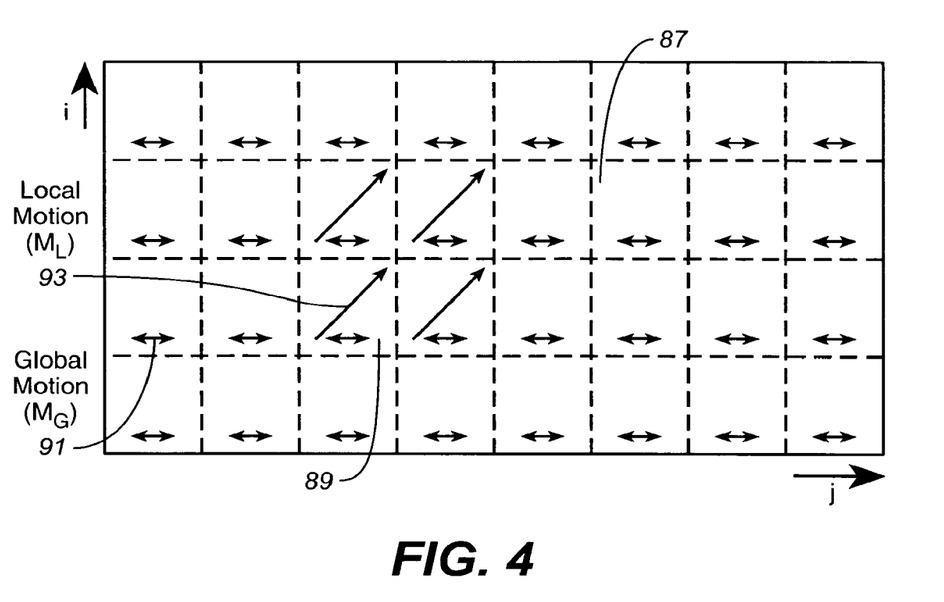
FIG. 4 represents an image frame with exemplary camera and scene motion vectors added to individual blocks of pixels.

FIG. 4 conceptually shows a single image with its pixels grouped into blocks of multiple pixels each, such as blocks 87 (represented by the i, j coordinates 3,6) and 89 (2,3). Motions of the scene being photographed relative to the camera image frame are indicated. An example image is illustrated to have a global motion vector $M_G$ indicated by arrows 91 in each of the blocks of pixels. This motion would result from camera shake, back-and-forth in a horizontal direction. Of course, other camera motion would be illustrated by different patterns. If the motion is up-and-down, for example, the global motion arrows would be shown vertically. If the camera motion follows a circular or elliptical pattern, two other possibilities, the motion would be shown by a circle or ellipse, respectively.

The magnitude and direction of global motion is calculated from data of N precapture images, preferably by the circuits 63 (FIG. 2), by detecting and quantifying overall movement between the pre-capture images. An example of a specific technique for calculating global motion is given in U.S. patent application Ser. No. 10/897,186, filed by Pinto et al. on Jul. 21, 2004. Alternatively, a mechanical motion sensor can be included in the camera for the purpose of providing a signal of the global motion but is not preferred.

In the example of FIG. 4, a portion of the image is shown to have additional local motion vectors $M_L$, in this case for four of the blocks, which are independent of any camera shake or other global motion. This represents motion of that small part of the scene being photographed relative to the rest of the scene and to the person holding the camera. The resulting motion within the image is in the direction of the arrows and with a relative velocity represented by the length of the arrows. Such motion can be from the movement of a person in the scene, vehicle motion, the action of wind on a tree, or from numerous other movements in scenes that are photographed. Algorithms for the calculation of motion within an image of between a sequence of images are known. An example is described in the above-identified U.S. patent application Ser. No. 10/897,186. Motion vectors can be calculated in a manner that is similar to the calculation of motion vectors used by known video compression algorithms, examples being those of the Moving Picture Experts Group, the most recent being MPEG-4.

By one motion calculation technique, vectors of motion, velocity and acceleration are calculated for each of the blocks of pixels of the image. These quantities give the motion of each block and allow its future location, speed and direction to be estimated. If a large object moves across the scene, for instance, then the blocks representing the object have motion vectors that point in the direction of the movement. If the image motion is due to camera shake only, the block motion vectors of all or most of a scene generally point in the same direction. The local motion vectors $M_L$ of this description are these individual block motion vectors after the global motion vector $M_G$ has been subtracted. So the vectors $M_L$ provide an indication of only local motion within the image of the scene. The vectors $M_L$ and $M_G$ are to that extent independent of each other.

Figure 5A:
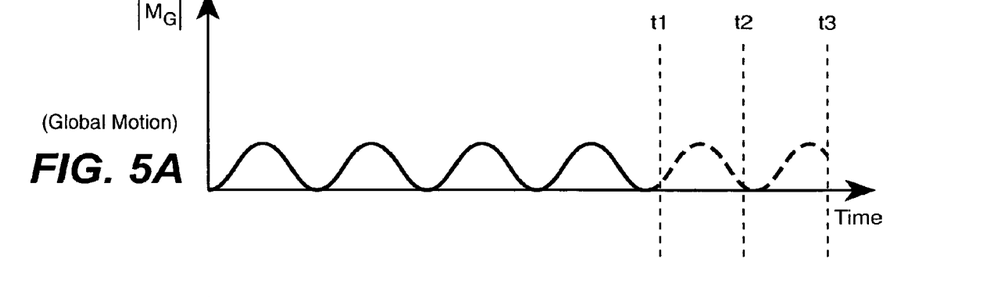
FIGS. 5A-5D represent amounts of motion of the image frame of FIG. 4, in an illustrative example.
Figure 5B:
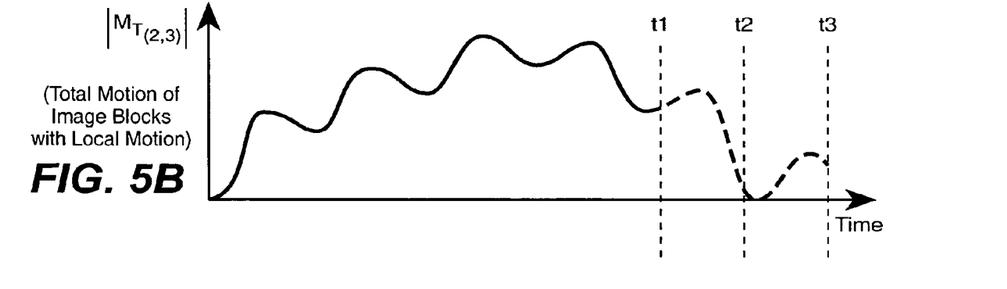
Figure 5C:
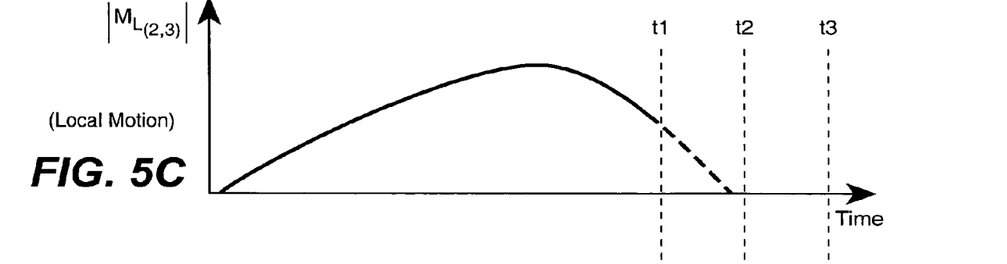

Curves of FIGS. 5A-5D provide an example of absolute values of local and global velocity vectors as a function of time, and combinations of them, in order to further describe the calculations of steps 73 and 79 (FIG. 3). FIG. 5A shows the global motion represented by the arrows 91 of FIG. 4. In this example, a back-and-forth motion of a camera is represented, having a zero speed (absolute velocity) at one extreme of its motion, a zero speed at the other end of its motion, and an increasing-decreasing speed function in between. FIG. 5C shows an example of the magnitude of local motion vector 93 of the pixel block 89 of FIG. 4. For illustrative purposes, this motion is shown to increase from zero to a maximum and then decrease during the pre-capture images. FIG. 5B shows the absolute value of a total motion vector $M_{T(2,3)}$ for only the pixel block 89. This is an arithmetic combination of the magnitudes of the curves of FIGS. 5A and 5C.

Figure 5D:
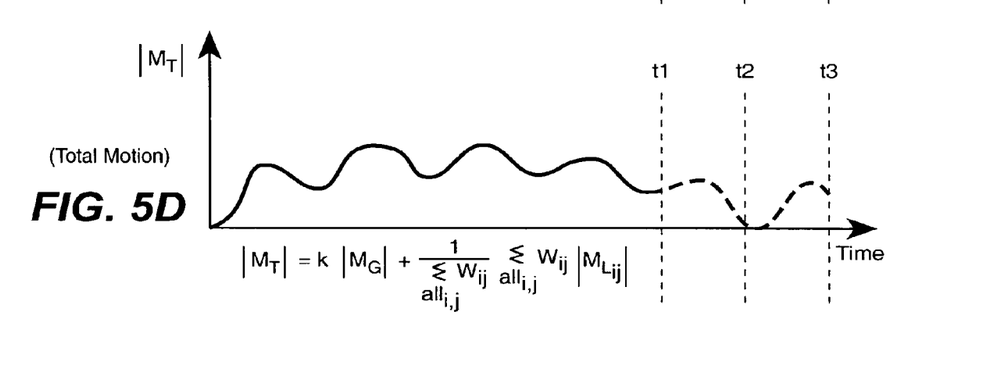

FIG. 5D shows an example of the total motion quantity $M_T$ for the entire image frame. The motion calculations result in one value of $M_T$ for each pre-capture image frame, and this is not a vector. It is the primary quantity used in the steps 79 and 85 (FIG. 3) to determine an exposure time and adjust the exposure parameters. Indeed, the quantities $M_T$ for a number of successive pre-capture images are used when it is desired to estimate a better time for the exposure. For these purposes, it is a combination of the global motion of FIG. 5A and a weighted average of the local motion quantities of the individual pixel blocks within the image. An equation for calculating $M_T$ of an image frame is given in FIG. 5D. The weight W of an individual pixel block (i,j) can be made to depend on its location within the image frame or on its relative luminance with respect to the rest of the image. The weight W may be a function of the distance of the block from the center of the image frame. Therefore, the total motion $M_T$ for an image depends on the number of blocks having local motion, the magnitude of that local motion and the relative position of the blocks with motion within the image. Further, the global motion $M_G$ may be multiplied by a constant k, as shown in the equation of FIG. 5D, to allow different weights to be given to the global velocity and the average of local velocities. If k is more than one, the global motion is weighted more and if less than one the local motion carries the greater weight. The overall total motion curve of FIG. 5D is similar to the total motion curve of FIG. 5B for a single pixel block, but lower in magnitude because the local motion of most pixel blocks of the image frame of FIG. 4 that are included in the average is zero.

In the example of FIGS. 5A-5D, data for pre-capture images are being acquired in the period before time t1. If the step 79 (FIG. 3) is being implemented, then the motion after acquiring the last pre-capture image at time t1 is estimated from data of the precapture images, as shown dashed in FIGS. 5A-5D. The motion detected from the pre-capture images is extrapolated into the future. A period t1-t3 is preferably defined in which the minimum motion is sought to be identified. The total motion (FIG. 5D) is, in this example, the quantity for which minimum motion is sought, and that total motion is zero at time t2. So that at time t2, the effects of motion on the picture being taken are estimated to be minimized, so this instant is selected to capture the image. Of course, actual motion functions can be more complicated than those illustrated in FIGS. 5A-5D, in which case a minimum value of $M_T$ is sought within the time period t1-t3.

As an alternative to making exposure adjustments based on the total motion of the scene relative to the camera image frame, the local motion of only a portion of the scene may be used. For example, the camera may be provided with a fixed or user definable outline, such as a rectangle, that can be positioned to surround a portion of the image for which motion compensation is primarily desired. In the example of FIG. 4, the user could surround image blocks $M_{L(2,3)}$, $M_{L(3,3)}$, $M_{L(3,4)}$, and $M_{L(2,4)}$ with such an outline. This portion of the image could be an object that is moving relative to other portions of the scene, such as a vehicle or a person. The processing then calculates a single local motion quantity, such as an average of the vector magnitudes for these blocks, and this quantity is then used to minimize blurring of such an object within the scene. To accomplish this, the local motion quantity is used in place of the total motion to determine the time to capture the image and/or to adjust the exposure parameters. The local motion of the outlined portion of the scene is thus taken into account while motion of other parts of the scene are not.

Figure 6A:
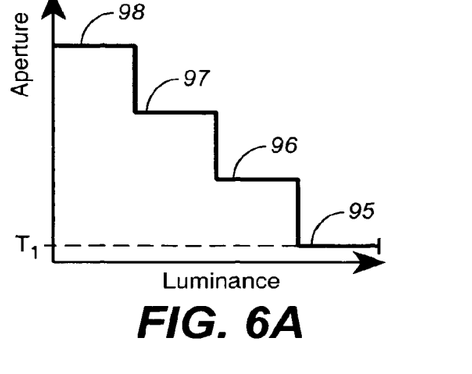
FIGS. 6A-6C show an example of automatic camera exposure parameters as a function of the luminance of the captured image.
Figure 6B:
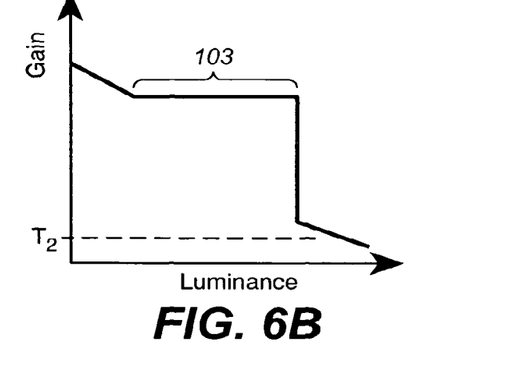
Figure 6C:
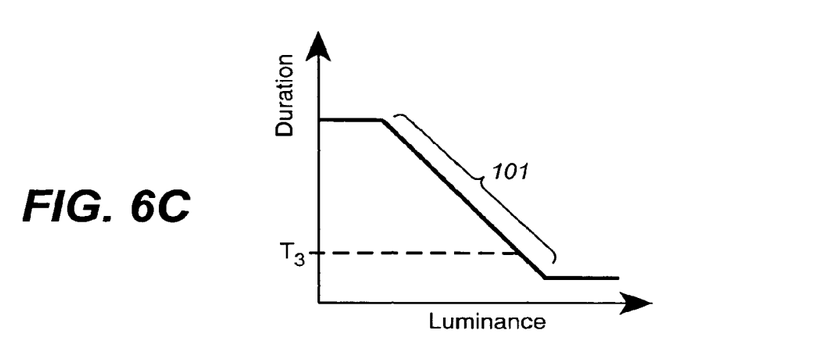

FIGS. 6A, 6B and 6C help to illustrate the automatic exposure calculation 75 (FIG. 3) and the choice that is made in the step 81 based upon these calculations. A digital camera, for example, often has only several discrete levels of aperture opening from which a selection is made to take a picture. Aperture openings 95-98 are shown in FIG. 6A. For each of these levels, there is a gain function such as illustrated in FIG. 6B and an exposure time (duration) function such as illustrated in FIG. 6C. A sloping portion 101 of the exposure duration curve (FIG. 6C) extends between the same luminescent levels as a flat portion 103 of the gain curve (FIG. 6B). The automatic exposure (AE) calculation of preliminary exposure parameters is accomplished by choosing a combination of aperture, gain and duration that provides an average output signal of the photosensor for an image that is within a predetermined range for a wide variety of illumination levels of the scene being photographed. The average luminescence of the image is maintained within boundaries. These calculations, made without benefit of image motion information, balances the desire for a short exposure time in case there is significant image motion against the desires of a deep field of view and low optical blur (small aperture opening) and low noise (low gain). Some level of image motion is necessarily assumed in the calculation of the parameters but no information of any particular image motion is used. It is in the step 85, that these preliminary parameters are adjusted for image motion if such an adjustment will likely improve the quality of the image.

The step 81 (FIG. 3), in this example, initially determines whether the calculated automatic exposure quantities are all below levels T1, T2 and T3 of FIGS. 6A-6C. If so, as previously discussed, there is no need to consider the motion calculations. This is because adjustment of the exposure parameters cannot significantly improve image quality. Since the exposure time is nearly as small as possible, any motion blur cannot be significantly reduced. In addition, there is no prospect of improving the depth of field or noise in the image by increasing the exposure time since a compensating decrease in the aperture opening and gain are not possible; they are already about as low as the camera allows.

Figure 7:
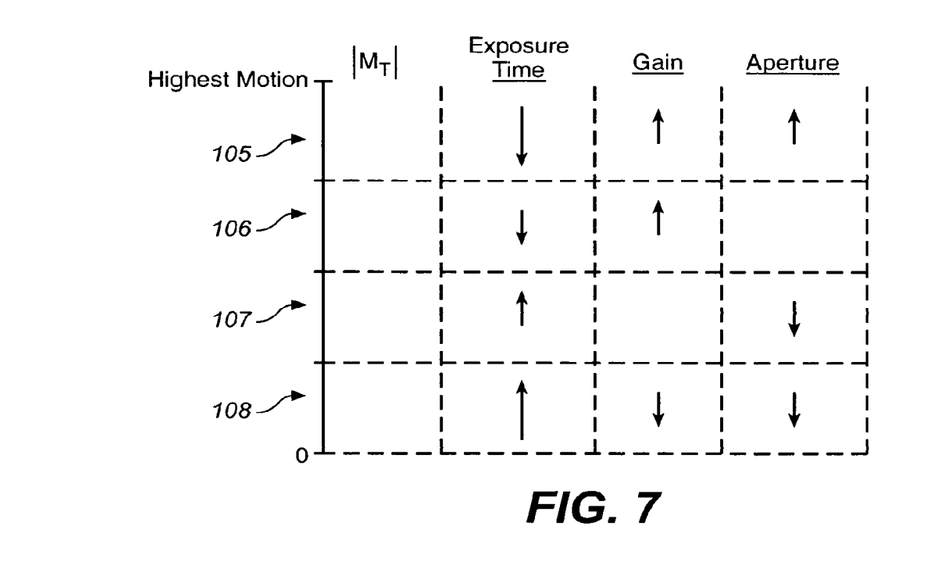
FIG. 7 illustrates a specific example of adjustments of the automatic camera exposure parameters for different levels of motion.

FIG. 7 illustrates an example of step 85 of FIG. 3 for adjusting the preliminary parameters in response to the motion calculations of the step 73. For simplicity, there are four different sets 105-108 of adjustments, depending upon the absolute magnitude of the total motion $M_T$ at the expected time of exposure. For the highest level 105, the exposure time is decreased significantly and one-half the image luminescence lost by that is restored by increasing the gain and the other one-half by increasing the aperture opening. In the next level 106, with lesser motion, the exposure time is reduced by a smaller amount and the lost image luminescence restored by increasing either the gain or the aperture. If there is little or no motion, the level 108, the exposure time may be increased and the extra luminescence is reduced by reducing the gain and the aperture opening, both with beneficial results on the captured image. If there is some small amount of motion, the level 107, the exposure time is increased a smaller amount and either the gain or the aperture opening is reduced to restore the image signal to about the original level of luminescence.

In the examples of gain adjustment given above, the gain level of the analog signal is adjusted before digitizing the signal and this adjusted level is then used during capture of the image. In addition to this, or in place of it, the gain of an image may be adjusted in the digital domain after data of the image have been captured and digitized. For example, the digital gain adjustment can be performed after the data have been captured in the camera's internal memory, as part of image processing or enhancement stage, but before compressing the data and writing it to a removable non-volatile memory. Although digital gain increase usually results in a noisier image than analog gain increase, it may be convenient to control the digital gain as well. The amount of digital gain that is required may be determined during the process that adjusts the exposure parameters in advance of image capture, as part of calculating the exposure time, aperture and perhaps analog gain, but then applied to the digital data of the image after it has already been captured. Alternatively, or in addition, the gain level of the image may be determined and adjusted as part of the post-processing or enhancement of the captured image data and applied thereafter in that stage.

The parameter adjustment example of FIG. 7 shows several motion thresholds between the sets 105-108 of adjustments. For any motion above the threshold between the sets 106 and 107, the parameters are individually adjusted in a single direction, and when the motion is below that threshold, the parameters are adjusted in the opposite direction. As a variation of this single threshold, two motion thresholds can be defined. When the motion is above the higher of the two thresholds, the parameters are individually adjusted in one direction and individually adjusted in the opposite direction when below the lowest threshold. For motion values between the thresholds, no adjustment of the preliminary parameters would be made.

CONCLUSION

Although the various aspects of the present invention have been described with respect to exemplary embodiments thereof, it will be understood that the present invention is entitled to protection within the full scope of the appended claims.

The invention claimed is:

1. A method of controlling operation of an imaging device to capture data of a scene, comprising:
monitoring motion within two or more images of the scene prior to its capture and relative to the imaging device, such that a quantity of relative motion is determined independent of another quantity of total motion that is separately monitored along each directional vector from a vector used for monitoring the relative motion within the two or more images of the scene, and wherein said separate monitoring of each directional vector provides a velocity and an acceleration of the total motion;
utilizing information from monitoring motion within the two or more images to calculate one or more exposure parameters including duration for use to capture data of each image; and
capturing data of the scene by use of the calculated one or more exposure parameters.

2. The method of claim 1, wherein at least one other exposure parameter that is calculated includes a size of an aperture through which light of the two or more images pass.

3. The method of claim 1, wherein at least one other exposure parameter that is calculated includes a gain, wherein the calculated gain is characterized by at least one of a gain of an analog signal or digital representations of the two or more images.

4. The method of claim 1, wherein utilizing information from monitoring motion within the image includes utilizing individual motion vectors of at least one distinct area within the two or more images to recognize motion of one portion of the two or more images with respect to another portion when calculating the one or more exposure parameters used to capture the data for the two or more images.

5. The method of claim 1, wherein utilizing information from monitoring motion within the two or more images includes utilizing at least one overall motion quantity calculated from individual motion vectors of at least one distinct area of each image when calculating the one or more exposure parameters used to capture the data for the two or more images.

6. The method of claim 1, wherein utilizing information to calculate the duration and at least one other exposure parameter includes first calculating a preliminary duration and at least one other preliminary exposure parameter without information from monitoring motion of at least one distinct area within the two or more images, and thereafter adjusting the preliminary duration and at least one other preliminary exposure parameter by use of the information from monitoring motion of a plurality of distinct areas of the two or more images.

7. The method of claim 1, further comprises monitoring motion of a plurality of distinct areas of the two or more images to indicate a level of image motion that is either below or above at least one predetermined threshold.

8. The method of claim 1, further comprises utilizing information from monitoring motion within at least one distinct area within the two or more images to estimate a time for capturing data of the two or more images, and thereafter capturing the data of the two or more images at the estimated time.

9. The method of claim 1, wherein information from monitoring motion within the image from includes an estimate of the motion at an estimated time for capturing data of the image.

10. The method of claim 1, wherein the determined quantity of relative motion is variable over time.

11. The method of claim 1, further comprises enabling a display of at least one of the two or more images from said monitoring of motion within the two or more images prior to the capture of data for the scene.

12. An imaging device to capture data of a scene, comprising:
a photodetector;
an optical system that projects light from the scene onto the photodetector;
a processing unit that receives data of at least two images of the scene projected onto the photodetector and enables actions including:
monitoring motion within two or more images of the scene prior to its capture and relative to the imaging device, such that a quantity of relative motion is determined independent of another quantity of total motion that is separately monitored along each directional vector from a vector used for monitoring the relative motion within the two or more images of the scene, and wherein said separate monitoring of each directional vector provides a velocity and an acceleration of the total motion;
utilizing information from monitoring motion within the two or more images to calculate one or more exposure parameters including duration for use to capture data of each image; and
capturing data of the scene by use of the calculated one or more exposure parameters.

13. The device of claim 12, wherein at least one other exposure parameter that is calculated includes a size of an aperture through which light of the two or more images pass.

14. The device of claim 12, wherein at least one other exposure parameter that is calculated includes a gain, wherein the calculated gain is characterized by at least one of a gain of an analog signal or digital representations of the two or more images.

15. The device of claim 12, wherein utilizing information from monitoring motion within the image includes utilizing individual motion vectors of at least one distinct area within the two or more images to recognize motion of one portion of the two or more images with respect to another portion if calculating the one or more exposure parameters used to capture the data for the two or more images.

16. The device of claim 12, wherein utilizing information from monitoring motion within the two or more images includes utilizing at least one overall motion quantity calculated from individual motion vectors of at least one distinct area within each of the two or more images when calculating the one or more exposure parameters that are used to capture the data for the two or more images.

17. The device of claim 12, wherein utilizing information to calculate the duration and at least one other exposure parameter includes first calculating a preliminary duration and at least one other preliminary exposure parameter without information from monitoring motion of at least one distinct area within the two or more images, and thereafter adjusting the preliminary duration and at least one other preliminary exposure parameter by use of the information from monitoring motion of a plurality of distinct areas within the two or more images.

18. The device of claim 12, further comprises monitoring motion of a plurality of distinct areas of the two or more images to indicate a level of image motion that is either below or above at least one predetermined threshold.

19. The device of claim 12, further comprises utilizing information from monitoring motion within at least one distinct area within the two or more images to estimate a time for capturing data of each image, and thereafter capturing the data of the each image at the estimated time.

20. The device of claim 12, wherein information from monitoring motion within the image from includes an estimate of the motion at an estimated time for capturing data of the image.

21. The device of claim 12, wherein the determined quantity of relative motion is variable over time.

22. The device of claim 12, further comprises a display for displaying at least one of the two or more images from said monitoring motion within the two or more images prior to the capture of data for the scene.

23. A non-transitory processor readable storage media that includes a plurality of processor executable instructions for capturing data of a scene, wherein the execution of the instructions enables actions, comprising:
    monitoring motion within two or more images of the scene prior to its capture and relative to the imaging device, such that a quantity of relative motion is determined independent of another quantity of total motion that is separately monitored along each directional vector from a vector used for monitoring the relative motion within the two or more images of the scene, and wherein said separate monitoring of each directional vector provides a velocity and an acceleration of the total motion;
    utilizing information from monitoring motion within the two or more images to calculate one or more exposure parameters including duration for use to capture data of each image; and
    capturing data of the scene by use of the calculated one or more exposure parameters.

24. The non-transitory storage media of claim 23, wherein at least one other exposure parameter that is calculated includes a size of an aperture through which light of the two or more images pass.

25. The non-transitory storage media of claim 23, wherein at least one other exposure parameter that is calculated includes a gain, wherein the calculated gain is characterized by at least one of a gain of an analog signal or digital representations of the two or more images.

26. The non-transitory storage media of claim 23, wherein utilizing information from monitoring motion within the image includes utilizing individual motion vectors of at least one distinct area within the two or more images to recognize motion of one portion of the two or more images with respect to another portion when calculating the one or more exposure parameters used to capture the data for the two or more images.

27. The non-transitory storage media of claim 23, wherein utilizing information from monitoring motion within the two or more images includes utilizing at least one overall motion quantity calculated from individual motion vectors of at least one distinct area of each image when calculating the one or more exposure parameters used to capture the data for the two or more images.

28. The non-transitory storage media of claim 23, wherein utilizing information to calculate the duration and at least one other exposure parameter includes first calculating a preliminary duration and at least one other preliminary exposure parameter without information from monitoring motion of at least one distinct area within the two or more images, and thereafter adjusting the preliminary duration and at least one other preliminary exposure parameter by use of the information from monitoring motion of a plurality of distinct areas of the two or more images.

29. The non-transitory storage media of claim 23, further comprises monitoring motion of a plurality of distinct areas of the two or more images to indicate a level of image motion that is either below or above at least one predetermined threshold.

30. The non-transitory storage media of claim 23, further comprises utilizing information from monitoring motion within at least one distinct area within the two or more images to estimate a time for capturing data of the two or more images, and thereafter capturing the data of the two or more images at the estimated time.

31. The non-transitory storage media of claim 23, wherein information from monitoring motion within the image from includes an estimate of the motion at an estimated time for capturing data of the image.

32. The non-transitory storage media of claim 23, wherein the determined quantity of relative motion is variable over time.

33. The non-transitory storage media of claim 23, wherein the actions further comprise enabling a display of at least one of the two or more images from said monitoring of motion within the two or more images prior to the capture of data for the scene.

* * * * *